United States Patent
Rosenlöcher et al.

(10) Patent No.: US 7,441,635 B2
(45) Date of Patent: Oct. 28, 2008

(54) FRICTION PAIRING FOR PARKING BRAKES IN MOTOR VEHICLES

(75) Inventors: Jens Rosenlöcher, Augsburg (DE); Mario Krupka, Adelsried (DE)

(73) Assignee: Audi AG (DE)

( * ) Notice: Subject to any disclaimer, the term of this patent is extended or adjusted under 35 U.S.C. 154(b) by 0 days.

(21) Appl. No.: 10/956,888

(22) Filed: Oct. 1, 2004

(65) Prior Publication Data

US 2005/0072637 A1 Apr. 7, 2005

(30) Foreign Application Priority Data

Oct. 2, 2003 (DE) ................................ 103 46 499

(51) Int. Cl.
 *F16D 69/00* (2006.01)
(52) U.S. Cl. .............................. 188/251 M; 188/251 A; 188/251 R; 188/73.1
(58) Field of Classification Search ............. 188/251 M, 188/251 R, 251 A, 73.1, 73.2, 218 XL; 192/107 M; 501/95.2; 523/152; 428/292.1
See application file for complete search history.

(56) References Cited

U.S. PATENT DOCUMENTS

| | | | | |
|---|---|---|---|---|
| 3,964,580 | A | * | 6/1976 | Hahm et al. ................ 188/73.1 |
| 4,728,552 | A | * | 3/1988 | Jensen, Jr. ..................... 428/91 |
| 5,007,508 | A | | 4/1991 | Lacombe |
| 5,306,678 | A | * | 4/1994 | Yoshida et al. ............. 501/95.2 |
| 5,878,849 | A | * | 3/1999 | Prunier et al. ........... 188/251 A |
| 6,030,913 | A | | 2/2000 | Heine et al. |
| 6,042,935 | A | * | 3/2000 | Krenkel et al. ............ 428/307.7 |
| 6,079,525 | A | | 6/2000 | Dietrich et al. |
| 6,110,268 | A | | 8/2000 | Gross et al. |
| 6,161,659 | A | * | 12/2000 | Maurice ..................... 188/171 |
| 6,221,475 | B1 | * | 4/2001 | Domergue et al. ........ 428/292.1 |
| 6,231,791 | B1 | | 5/2001 | Heine et al. |
| 6,248,269 | B1 | * | 6/2001 | Dietrich et al. ............. 264/29.1 |
| 6,265,071 | B1 | * | 7/2001 | Gross et al. .................. 428/408 |
| 6,479,413 | B1 | * | 11/2002 | Booher ....................... 442/101 |
| 6,527,092 | B2 | | 3/2003 | Gruber et al. |
| 6,668,985 | B2 | * | 12/2003 | Krenkel et al. .......... 188/251 M |
| 6,716,376 | B1 | * | 4/2004 | Haug et al. ................. 264/29.1 |
| 6,742,633 | B1 | * | 6/2004 | Sherman et al. .......... 188/79.64 |
| 6,759,117 | B2 | * | 7/2004 | Bauer et al. ................ 428/293.4 |
| 6,878,331 | B2 | * | 4/2005 | Huang et al. ................ 264/434 |
| 7,261,846 | B2 | * | 8/2007 | Bauer et al. ................. 264/29.1 |
| 2001/0051258 | A1 | | 12/2001 | Hanzawa et al. |
| 2003/0057040 | A1 | | 3/2003 | Bauer et al. |
| 2003/0129375 | A1 | * | 7/2003 | Bauer et al. ............... 428/293.4 |
| 2004/0127600 | A1 | * | 7/2004 | Bauer et al. ................. 523/152 |

FOREIGN PATENT DOCUMENTS

| | | |
|---|---|---|
| DE | 197 10 105 | 9/1998 |
| DE | 197 11 830 | 10/1998 |
| DE | 197 27 586 | 2/1999 |
| DE | 199 29 358 | 12/2000 |
| JP | 2000-219872 | * 8/2000 |

\* cited by examiner

*Primary Examiner*—Robert A. Siconolfi
*Assistant Examiner*—Mariano Sy
(74) *Attorney, Agent, or Firm*—Connolly Bove Lodge & Hutz

(57) ABSTRACT

Frictional pairing in motor vehicles, including a carbon-ceramic brake disk or a grey cast iron brake disk and a brake pad for the brake caliper of the parking brake, characterised in that the brake pad comprises a fiber-reinforced ceramic composite material, which has a matrix with phases of silicon carbide and reinforcement fibers of carbon, graphite, silicon carbide or whiskers of high-melting metals with a melting temperature of over 1500° C., and a parking brake comprising these material.

8 Claims, No Drawings

FRICTION PAIRING FOR PARKING BRAKES IN MOTOR VEHICLES

FIELD OF THE INVENTION

The present invention relates to a frictional pairing for parking brakes in motor vehicles, in particular, parking brakes which act on carbon-ceramic brake disks.

BACKGROUND OF THE INVENTION

Frictional pairings for service brakes typically are selected such that the brake pads cooperating with the disk or drum are softer than the material of the disk or drum, since worn brake pads can be changed more easily and more cost-effectively than the disks or drums. For simplicity, the term "brake pads" is meant to include all brake pads having at least a lining of the specified material on the friction surface.

Upon selection of identical materials for the frictional pairing of brake pad linings and brake disks the brake disks would wear to the same extent as the brake pads; this is not desired for service brakes for the reasons set forth above.

Typically, therefore, for brake pads in service brakes, organically bound materials (using resins) are used which comprise fibers and particulate hard materials as friction materials.

Friction linings for brake pads have been known from DE-A 197 11 830, which brake pads can be used in connection with brake bodies made from fiber-reinforced ceramics and are made by sintering of mixtures of carbon and metal particles, which likewise contain, additionally, hard material particles and/or a solid lubricant. These brake pads indeed show reduced wear in combination with carbon-ceramic brake disks, compared with common organically bound linings; however, the static friction appears to still need improvement. From DE-C 197 27 586, a brake system including a friction pairing has been known wherein both brake disk and brake pads are made from a fiber-reinforced ceramic composite, and where a C/C body (a body of porous carbon reinforced with carbon fibres) is used having a density which is, at least in the region of the surface, higher than that of the C/C body used to make the brake disk. During siliconisation, less silicon can penetrate into the dense body and react with the carbon therein, which causes the body for the brake pads to comprise less silicon carbide than the body for the brake disk, and therefore, the brake pads are less hard than the brake disk. The fibre orientation in both bodies is essentially isotropic.

In contrast to brake pads for brakes used in the driving mode (service brakes, destined to decelerate a vehicle in motion to a lower velocity) which must have a sufficient resistance to abrasion and a high sliding, or dynamic, friction coefficient, only static friction counts for brake pads for parking brakes. In particular, abrasion is not a significant issue in a parking brake as there usually is no wear by dynamic friction.

Upon parking of a motor vehicle with brake disks heated by operation, of course, cooling through common ventilated structures of the brake disks does not occur. Brake disks and the brake pads of the parking brake, then, are in close contact by contact pressure of the parking brake and cool only slowly. It has been shown that with such operating conditions, the brake pads known from the state of the art in connection with carbon-ceramic brake disks are markedly affected and have too little static friction at high temperature. This insufficient static friction is already apparent in a cold operating state. As hot bodies shrink upon cooling, pressure exerted on the brake pads will also decrease upon cooling and will be insufficient to hold back a vehicle on a slope. The brake pads known from DE 197 27 586 also have the disadvantage that their hardness and temperature resistance due to their lower density in the siliconised state, and their heat conductivity are insufficient for use in a parking brake.

A further disadvantage of the brake pads known from the state of the art for parking brakes is the fact that an interlayer between the brake disk and the brake pad of the parking brake is formed after longer standing time of a motor vehicle, in particular in moist surroundings, by corrosion on the contact surface between the brake pad and brake disk; this condition is referred as "the brake is corrosion locked". Upon loosening of this connection (requiring a garage stop), residues of this interlayer remain on the brake disk which then must be trimmed off or replaced.

Therefore, brake pads for parking brakes are needed which are not damaged with high temperatures in contact with carbon-ceramic brake disks, and which also provide the highest possible static friction in a cold operating state in combination with carbon-ceramic brake disks. The motor vehicle in question must be held reliably also at inclinations of 45° and more; this is not possible with linings or brake pads known to this point in time as described supra. Further problems are avoiding corrosion locking of the brake pads on the brake disk and providing a high heat conductivity within the brake pads.

SUMMARY OF THE INVENTION

These problems are solved by brake pads whose material is a fiber-reinforced ceramic, wherein the reinforcement fibers are selected from carbon fibers, graphite fibers, silicon carbide fibers, and whiskers of ceramic materials and from metals, in particular, high-melting metals with a melting temperature in excess of 1400° C., such as tantalum, tungsten, molybdenum, niobium, and hafnium. The matrix of the ceramic contains phases of silicon carbide, as well as phases of carbon and/or phases of silicon. The mass fraction of the reinforcement fibers in the fiber-reinforced ceramic preferably is from 20% to 60%; in particular, from 25% to 55% and, more specifically, from 30% to 50% are preferable. Fibers are preferably oriented in a way that at least 50% of the fibres include an angle of at most 45° with the normal on the plane of the friction surface of the brake pad. It is preferred to use short fibers or short fiber bundles having an average length of up to 30 mm, preferably up to 20 mm, and especially preferred, up to 10 mm. The fibers may be present in the form of bundles in the brake pad (or lining) materials; it also possible, however, to use reinforcing fibers in the form of tissues. In this case, it is preferred to orient the tissues in a way that the planes of the tissues include an angle with the normal of the friction surface of the brake pad of at most 45°. The mass fraction of silicon carbide preferably amounts to from 30% to 70%; in particular, from 35% to 65%, and more specifically, from 40% to 60% is preferred. The fiber-reinforced ceramic contains no metal powder and preferably no particulate hard material or solid lubricant. Specifically, in the experiments on which the present invention is based, it was found that with increased temperatures such as those that occur after a trip with enhanced brake load (for example, during a mountain trip on a mountain pass, up to 1000° C.), and the contact pressure required to stop the vehicle, surface damage of the carbon-ceramic brake disk occurs if the brake pads for the parking brake contain metal powder. Surprisingly, it was found that with contact between similar materials with brake disk and parking brake lining, such damage does not occur or at least does not lead to surface damage of the carbon-ceramic brake disk. Surprisingly, it was further found that a corrosion locking of the brake pads and brake disk can be avoided by the use of the brake pads of the present invention for the parking brake. This surprising and advantageous effect has been found also for a combination of a brake pad of the present invention with a commonly used brake disk made of grey cast iron.

DETAILED DESCRIPTION OF THE PREFERRED EMBODIMENTS

Preferably, the reinforcement fibers are made from carbon, in the form of short fibers (with an average length of 10 µm to 50 mm, preferably, up to 30 mm), bundles of such short fibers, which contain from 400 to 500,000 of such short fibers with an essentially parallel orientation, or as a web or other two-dimensional textile form, such as fleece and knitted fabrics.

The brake pads of the present invention for parking brakes preferably are mounted on steel plates, which are fixed on ends of the leg of the brake caliper. Fixing is preferably effected with a high temperature-stable adhesive, by riveting, or by soldering with a copper-containing solder. It is particularly preferred to fit the brake pad into a recess or pocket milled into the support plate.

The brake pads according to this invention preferably have a static coefficient of friction, in combination with a carbon ceramic brake disk, of at least 0.65, more preferred, at least 0.67, and in particular, at least 0.69. Especially preferred values for the static friction coefficient of at least 0.70 are found if the orientation of the reinforcing fibers within the brake pad is essentially perpendicular to the friction surface, or essentially parallel to the normal of the friction surface. An orientation is described as "essentially perpendicular to the friction surface" if at least 50% of the fibers include an angle of at most 45° with the normal of the plane of the friction surface. The coefficient of static friction is the greater as the orientation is more in the direction of the normal, it is therefore especially advantageous if at least 70% of the fibers include an angle of at most 45° with the normal, particularly if this angle is at most 30°.

Manufacturing of the fiber-reinforced ceramic materials for the brake pads may be done according to known methods, such as those described in DE 197 10 105. It has proven especially favourable to use one of the following manufacturing methods:

In the case of tissues being used as reinforcement, these are impregnated with a carbonisable material such as a phenolic resin, dried, heated under exclusion of oxydising agents whereby the carbonisable material is essentially transformed to carbon. A plurality of tissue layers are superposed and preferably stacked and cut in a way to arrive at the desired fiber orientation. The planes of the tissue layers are therefore preferentially perpendicular to the friction surface of the pad, at least do they include an angle of not more than 45° with the normal of the plane of the friction surface.

In the case of reinforcement by short fibers, short fibers or bundles of short fibers are mixed with a carbonisable material, such as a phenolic resin, the mixture thus prepared is preferably extruded or densified via vibromoulding. The advantage of extrusion is orientation of the reinforcing fibers in the extrusion direction effected by this step. The bodies used in manufacturing the brake pads are cut from the extrudate in a way that the extrusion direction is preferentially parallel to the direction of the normal of the friction surface, or so that they include an angle of not more than 45° with each other.

The bodies formed in these processes are also carbonised; the carbonised bodies are subjected to infiltration with liquid silicon in the known manner, whereby silicon reacts with the carbon of the said bodies under formation of silicon carbide.

In a friction pairing with a carbon ceramic brake disk, static friction has been determined using the brake pads of the invention. The highest values have been measured with extruded brake pads cut perpendicularly to the extrusion direction (where the extrusion direction is parallel to the normal of the plane; a cofficient $\mu_s$ of static friction of from 0.8 to 1.0 has been reached). In these experiments, static friction coefficients of at least 0.6 have been measured even in combination with cast iron brake disks.

The invention claimed is:

1. A method of holding a parked motor vehicle at an inclination of 45° or more by
   providing a parking brake which comprises a frictional pairing, comprising a carbon ceramic brake disk and a brake caliper, including a brake pad for the brake caliper, and
   bringing the brake disk and the brake pad into close contact by exerting pressure on the brake pad,
   wherein the brake pad consists of a fiber-reinforced ceramic composite material, which has a matrix with consisting of phases of silicon carbide, silicon and carbon, and short reinforcement fibers of carbon, graphite, silicon carbide, and wherein this frictional pairing has a static friction coefficient of at least 0.65, and wherein the fibers are oriented in a way that at least 70% of the fibres include an angle of at most 30° with the normal of the plane of the friction surface of the brake pad, and wherein said brake pad is not damaged by high temperatures in contact with the carbon ceramic brake disk of up to 1000° C., and wherein said brake pad is made by mixing short fibers or bundles of short fibers with a carbonisable material to prepare a mixture, extruding this mixture to form an extrudate, cutting the extrudate to form bodies, carbonising said bodies and subjecting the carbonised bodies to infiltration with liquid silicon whereby silicon reacts with the carbon of said bodies under formation of silicon carbide to yield said brake pad, wherein said bodies are cut in a way that the extrusion direction is parallel to the direction of the normal of the friction surface of said brake pad.

2. The method of claim 1, characterised in that the mass fraction of the reinforcement fibers in the composite material which makes up the brake pad is from 20% to 60%.

3. The method of claim 1, characterised in that the mass fraction of silicon carbide in the composite material which makes up the brake pad amounts to from 30% to 70%.

4. The method of claim 1 wherein the reinforcement fibers are carbon fibers having an average length of from 10 µm to 30 mm.

5. A method of holding a parked motor vehicle at an inclination of 45° or more by
   providing a parking brake which comprises a frictional pairing comprising a brake disk made of grey cast iron, and a brake caliper, including a brake pad for the brake caliper, and
   bringing the brake disk and the brake pad into close contact by exerting pressure on the brake pads,
   wherein the brake pad consists of a fiber-reinforced ceramic composite material, which has a matrix with consisting of phases of silicon carbide, silicon and carbon, and short reinforcement fibers of carbon, graphite, silicon carbide, and wherein this frictional pairing has a static friction coefficient of at least 0.60, and wherein the fibers are oriented in a way that at least 70% of the fibres include an angle of at most 30° with the normal of the plane of the friction surface of the brake pad, and wherein said brake pad is made by mixing shod fibers or bundles of shod fibers with a carbonisable material to prepare a mixture, extruding this mixture to form an extrudate, cutting the extrudate to form bodies. carbonising said bodies and subjecting the carbonised bodies to infiltration with liguid silicon whereby silicon reacts with the carbon of said bodies under formation of silicon carbide to yield said brake pad, wherein said bodies are cut in a way that the extrusion direction is parallel to the direction of the normal of the friction surface of said brake pad.

6. The method of claim 5, characterised in that the mass fraction of the reinforcement fibers in the composite material which makes up the brake pad is from 20% to 60%.

7. The method of claim 5, characterised in that the mass fraction of the silicon carbide in the composite material which makes up the brake pad is from 30% to 70%.

8. The method of claim 5 wherein the reinforcement fibers are carbon fibers having an average length of from 10 μm to 30 mm.

\* \* \* \* \*